US006374053B1

(12) United States Patent
Raposa et al.

(10) Patent No.: US 6,374,053 B1
(45) Date of Patent: Apr. 16, 2002

(54) UNDERWATER STROBE LIGHT CONTROL CIRCUITRY

(75) Inventors: John R. Raposa; Daniel P. Thivierge, both of Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/565,236

(22) Filed: Apr. 28, 2000

(51) Int. Cl.$^7$ ............................................. G03B 17/00
(52) U.S. Cl. ..................... 396/263; 396/429; 324/179
(58) Field of Search ............................. 396/4, 25, 28, 396/155, 180, 263, 429; 324/178, 179

(56) References Cited

U.S. PATENT DOCUMENTS 3,787,770 A * 1/1974 Cote et al. ................... 324/178
4,385,227 A * 5/1983 Bridges ......................... 377/2

* cited by examiner

Primary Examiner—David M. Gray
(74) Attorney, Agent, or Firm—Michael J. McGowan; James M. Kasischke; Prithvi C. Lall

(57) ABSTRACT

A device for controlling a strobe light in underwater high speed photography in a first aspect includes a plurality of spaced break screen or sense coil members, a projectile for launch through the series of break screen or sense coil members, a camera having a shutter opened at a predetermined timing prior to release of the projectile and closing at a predetermined timing subsequent to release of the projectile, and a strobe light opposed to the camera for illumination at a time when the projectile passes in front of the camera. A trigger device, such as a break screen or sense coil, is positioned immediately up-range of the camera. With a time delay programmed into a Programmable Array Logic (PAL), a control circuit receives the trigger information and creates a timed signal to control the illumination of the strobe light. In accordance with another aspect of this invention, the control circuitry includes discrete logic devices programmed such that illumination is controlled by the control circuitry at the exact moment the projectile passes the lens of the camera.

9 Claims, 3 Drawing Sheets

UNDERWATER STROBE LIGHT CONTROL CIRCUITRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to a circuit for triggering a strobe light or other appropriate source of illumination located between two underwater break screens.

(2) Description of the Prior Art

The Adaptable High Speed Underwater Munition (AHSUM) project needed a method to obtain photographs of underwater projectiles during the course of their test series. Prior to this time, there was no satisfactory means of obtaining the photographs that were needed, nor was there a device applicable to a variety of conditions.

The following patents, for example, disclose various types of photography, including underwater photography and circuits in connection therewith, but do not disclose a device for controlling an underwater strobe light for the purpose of taking underwater photographs of a high speed projectile.

U.S. Pat. No. 3,690,233 to Billingsley;
U.S. Pat. No. 4,418,999 to Baxter;
U.S. Pat. No. 4,878,074 to Peng; and
U.S. Pat. No. 5,581,078 to Sears.

Specifically, the patent to Billingsley discloses a detecting means responsive to a passing car to produce an indicating signal. A camera and a flash lighting unit positioned down the road from the detecting means are activated simultaneously to illuminate and photograph the oncoming car. The illumination lies primarily in a spectrum including the visible deep red, the near infra-red and the intermediate infra-red. Only the visible deep red and the near infra-red radiations are able to penetrate the infra-red filtering windshield and then reflect back to the camera through an optical filter which passes only said visible deep red, near the infra-red and the small amount of intermediate infra-red radiations that pass back through the windshield. Thus the glare from ambient light is eliminated. A film sensitized to the visible deep red and to the near infra-red radiations is employed in the camera. The aforementioned system provides a photograph of the driver's facial features either during the day or at night and without causing impairment of his vision.

The patent to Baxter discloses a synchronizing circuit which enables a desired phenomena to occur, such as the discharge of a flash illuminating means at a precise point along the path of travel of an article irrespective of the speed of the article in that path. The circuit utilizes two spaced sensors upstream of the precise point. The sensors are operable to detect the passage of the article and each sensor is connected to the respective counter. When the sensor detects the passage of the article, it starts its respective counter counting in one direction at one particular counting rate. When the second sensor detects the passage of the article, it causes its respective counter to count in the opposite direction from the value of the count in the first count at a different but faster counting rate. The circuit includes gate means which determine when the count has returned to a predetermined count to then cause said phenomena to occur.

Slaght et al. discloses a system and method for determining the relative velocities of a projectile at different portions of its path in which a plurality of signaling detector stations are arranged at predetermined intervals along such path. A common receiving station is arranged to receive signals from the detector stations through a common communication channel and has a memory unit capable of storing pulses corresponding to the signals received, and a calculator capable of analyzing adjacent pairs of the pulses which have been produced by passage of the projectile over two or more of the path intervals monitored by the detector stations to determine the relative velocities of the projectile as it traverses the path intervals monitored by different pairs of detector stations. This information is used to study retardation properties of a projectile.

Peng discloses a dynamic particulate observation apparatus for monitoring a moving particle including a black box having an internal space enclosed therewithin, which shields the space form the infiltration of light outside; means for generating particles moving across the black box; means for emitting a flash of light within the black box at a predetermined frequency; and means for taking down the images of the particles generated by the generating means when the emitting means emits flashlights. The dynamic particulate observation apparatus according to the invention is cheap and easy to assemble, and renders all the necessary functions of a conventional dynamic particulate observation apparatus.

The patent to Sears discloses a ballistic optical camera trigger having an integrated circuit capable of converting light to a proportional frequency, wherein the integrated circuit has a fast response time and a wide dynamic range which allows it to sense positive or negative changes in light fast enough to trigger without delay for high speed imaging without computational delays or jitter causing interference. The frequency output of the integrated circuit is tracked by a phase lock loop/voltage controlled oscillator to allow it to follow slow changes in light, but not fast changes in light caused by, for example, a projectile such a as a bullet. The frequency output from the integrated circuit is provided to one input of a logic gate which receives at another input thereof, a shaped pulse from the phase lock loop/voltage controlled oscillator circuit, wherein the output of the logic gate is applied to a one-shot for outputting a trigger signal.

It should be understood that the present invention would in fact enhance the functionality of the above patents by providing a control device for an underwater strobe light for the purpose of taking underwater photographs, particularly in a test environment.

SUMMARY OF THE INVENTION

Therefore it is an object of this invention to provide a device for controlling a source of illumination in underwater photography.

Another object of this invention is to provide a device for controlling a strobe light in underwater high speed photography.

Still another object of this invention is to provide a device for controlling a strobe light in underwater high speed photography, the device including a novel control circuitry.

A still further object of the invention is to provide a circuitry which is an accurate and inexpensive method to control a timed illumination of a strobe light in underwater high speed photography.

Yet another object of this invention is to provide a device and circuitry for controlling a strobe light in underwater high speed photography which is simple to manufacture and easy to use.

In accordance with one aspect of this invention, there is provided a device for controlling a strobe light in underwater high speed photography. The device includes a plurality of spaced break screen members or sensing coils, a projectile for launch through the series of break screen members, a camera having a shutter opened at a predetermined timing prior to release of the projectile and closing at a predetermined timing subsequent to release of the projectile, and a strobe light opposed to the camera for illumination at a time when the projectile passes in front of the camera. A trigger device is positioned on the break screen member positioned immediately uprange of the camera. With a time delay programmed into a Programmable Array Logic (PAL), a control circuitry receives the trigger information and creates a timed signal to control the illumination of the strobe light.

In accordance with another aspect of this invention, the control circuitry includes a first D flip-flop for receiving a signal output from a break screen upon passing of a projectile therethrough, the first D flip-flop additionally having a constant voltage applied to its D-input and a resulting latched output signal. An AND gate receives an output signal of the first D flip-flop, the AND gate additionally having a CRYSTAL_IN signal applied thereto for maintaining a stable clock to counters of the PAL, and a resulting output signal only when the latched output signal from the first D flip-flop is high. An N-bit counter receives the output signal of the AND gate, the N-bit counter outputting delay generation logic upon lapse of a predetermined length of time. A second D flip-flop receives the delay logic signal, and additionally has a constant voltage applied to it's D input and a resulting latched output signal, wherein a rising edge of an output generated by the second D flip-flop identifies a beginning of a camera activation window. A second AND gate receives the output signal of the second D flip-flop, the second AND gate additionally receives a CRYSTAL_IN signal applied thereto for maintaining a stable clock to counters of the PAL, and a resulting output signal is provided by the second D flip-flop. A second independent N-bit counter outputs a count. A second delay generation logic block receives the output of the second N-bit counter, and outputs a high pulse signal upon lapse of a predetermined count. A third D flip-flop receives the output pulse signal from the second delay generation logic, and additionally has a constant voltage applied to it's D input and a resulting latched output signal, wherein a rising edge of an output generated by the third D flip-flop identifies an end of the camera activation window. An exclusive OR gate receives outputs from each of the second D flip-flop and the third D flip-flop, the exclusive OR gate producing a high pulse from the time delayed trig out goes high to the time second delay goes high, an output of the exclusive OR gate passing through an inverter to generate the desired low pulse. This output signal is buffered via a separate non-inverting buffer (whose open collector is pulled up to 5 VDC) and then sent to the strobe light trigger.

Illumination is controlled by the control circuitry at the exact moment the projectile passes the lens of the camera.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a control circuitry for controlling an underwater strobe light for the purpose of taking underwater photographs of a high speed projectile tested in the Adaptable High Speed Underwater Munition (AHSUM) project. The control circuitry essentially senses when the projectile has passed through a break screen or sensing coil and turns on a strobe light at the exact time the projectile is passing through a 35 mm camera field of view. The camera's shutter is opened approximately 200 msec prior to the shot and closes immediately after the picture has been taken (film has been exposed by strobe light pulse of light).

The Adaptable High Speed Underwater Munition (AHSUM) project needed a method to obtain photographs of underwater projectiles during the course of their test series. The test apparatus is shown in FIG. 1.

Figure 1:
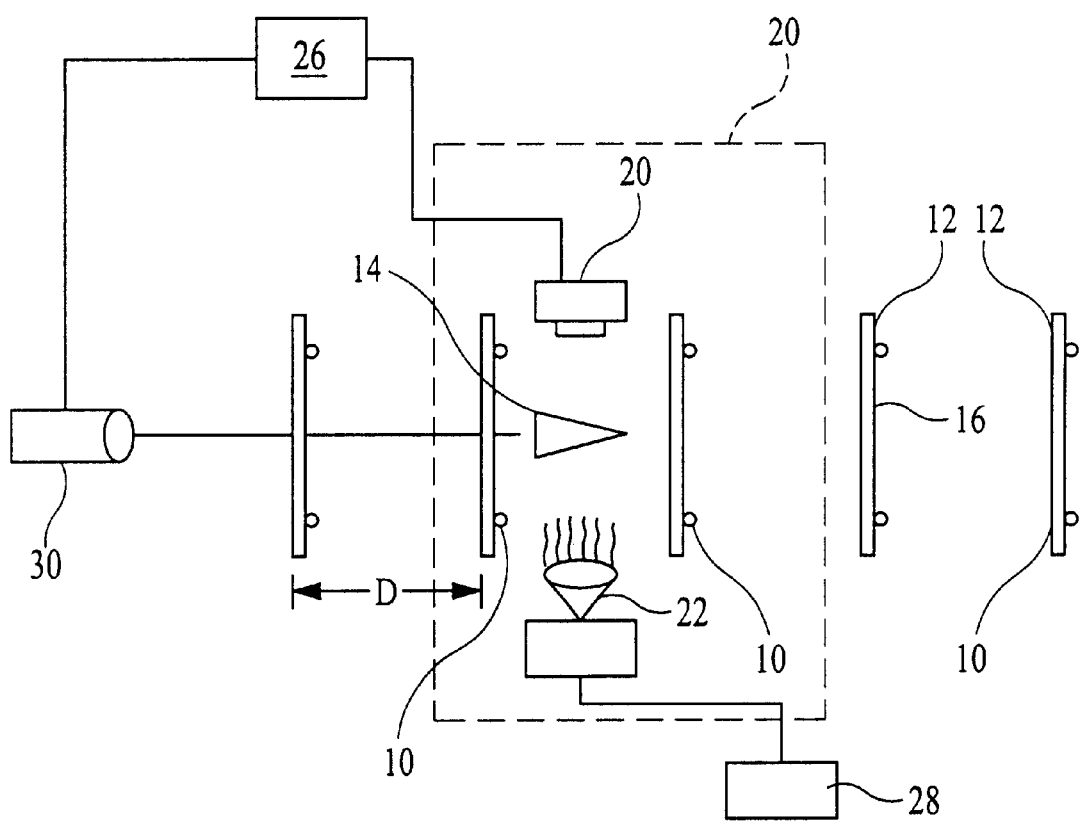
FIG. 1 is a plan view of a first preferred embodiment of the present invention.

In FIG. 1, there is shown a plurality of sensing devices 10 all spaced a predetermined distance D apart. These sensing devices 10 can be either sensing coils or break screens. Each sensing device 10 is mounted to a steel plate 12 having an opening formed therein for passage of a projectile 14 therethrough as discharged from a gun 30. The opening may be of any shape suitable for a clean passage of the projectile 14, however, a circular opening was utilized in the actual device. The steel plate 12 is not only used as a fastening surface for the sensing device 10, but as a barricade to protect the surrounding facility and personnel in the event the projectile 14 strays off course.

The sensing device 10 may be further constructed as a break screen having clear plastic sheets or film 16, similar to a transparency. A continuous resistive trace 18 winds its way back and forth from one side of the film 16 to the other and is sandwiched between two of the sheets of film 16. It is understood that alternative forms of capture may be used in connection with one or more of the sheets of film 16, and such modifications are intended to be included within the scope of the invention. Both ends of the resistive trace 18 are connected to the input of a control circuitry described in detail in co-pending application entitled Underwater High Speed Projectile Break Screen Based Speed Sensing Circuit for the Adaptable High Speed Underwater Munition (AHSUM) Project.

Referring further to FIG. 1, there is additionally shown a camera 20 opposed to a source of illumination such as a strobe light 22. While a strobe light 22 is used for the purposes of illustration, it should be understood that this does not preclude other appropriate sources of illumination should they be suitable for use in the present invention.

It is not possible to operate camera 20 manually and capture the desired photographs of the projectile 14 passing by at a high speed. Therefore, a system was required to automatically operate the camera 20. Since the shutter of the camera 20 cannot operate quickly enough to take a picture of the projectile 14 passing by at high speed, an alternate approach is devised. The camera 20 is located in an opaque enclosure 24 through which the projectile 14 will traverse. This enclosure 24 is preferably constructed from black plastic sheeting material. A computer 26 is joined to control camera 20 and gun 30. The computer 26 opens the shutter of the camera 20 approximately 200 msec prior to launching the projectile 14. The computer 26 closes the shutter 700 msec later, well after the projectile 14 has run its course. The strobe light 22 is also located in the enclosure 24 and is pulsed on for a predetermined time (typically 3 μsec) when the projectile 14 passes to expose the camera's film, taking a picture of the projectile 14. The control circuitry (FIG. 2) of the strobe light 22 is activated when the projectile 14 passes through the sensing device 10 located immediately up-range of the camera 20. A time delay must be incorporated to compensate for the time required for the projectile to reach the camera equipment after passing through the break screen or voltage sense coil.

Figure 2:
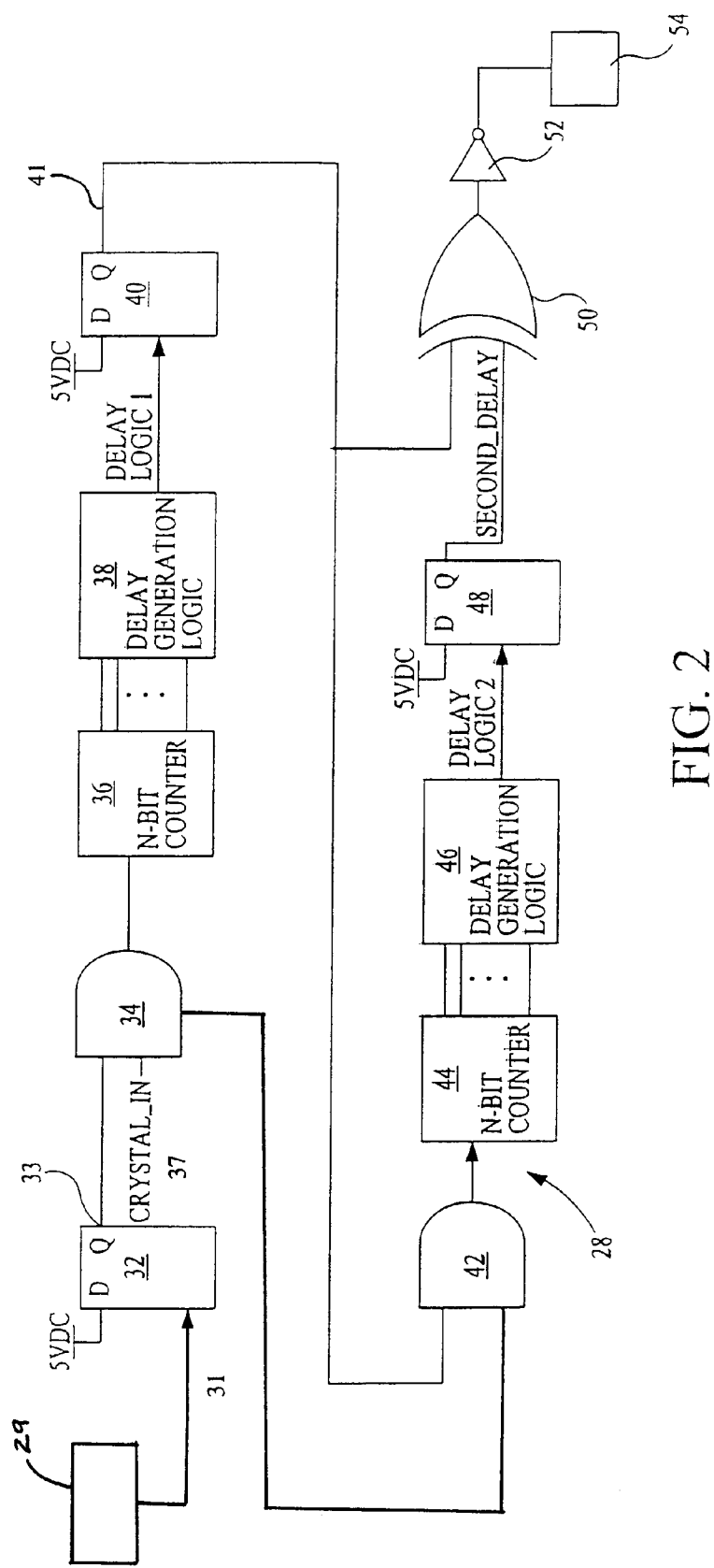
FIG. 2 is a diagrammatic view of the circuitry used in the preferred embodiment of the invention.
Figure 3:
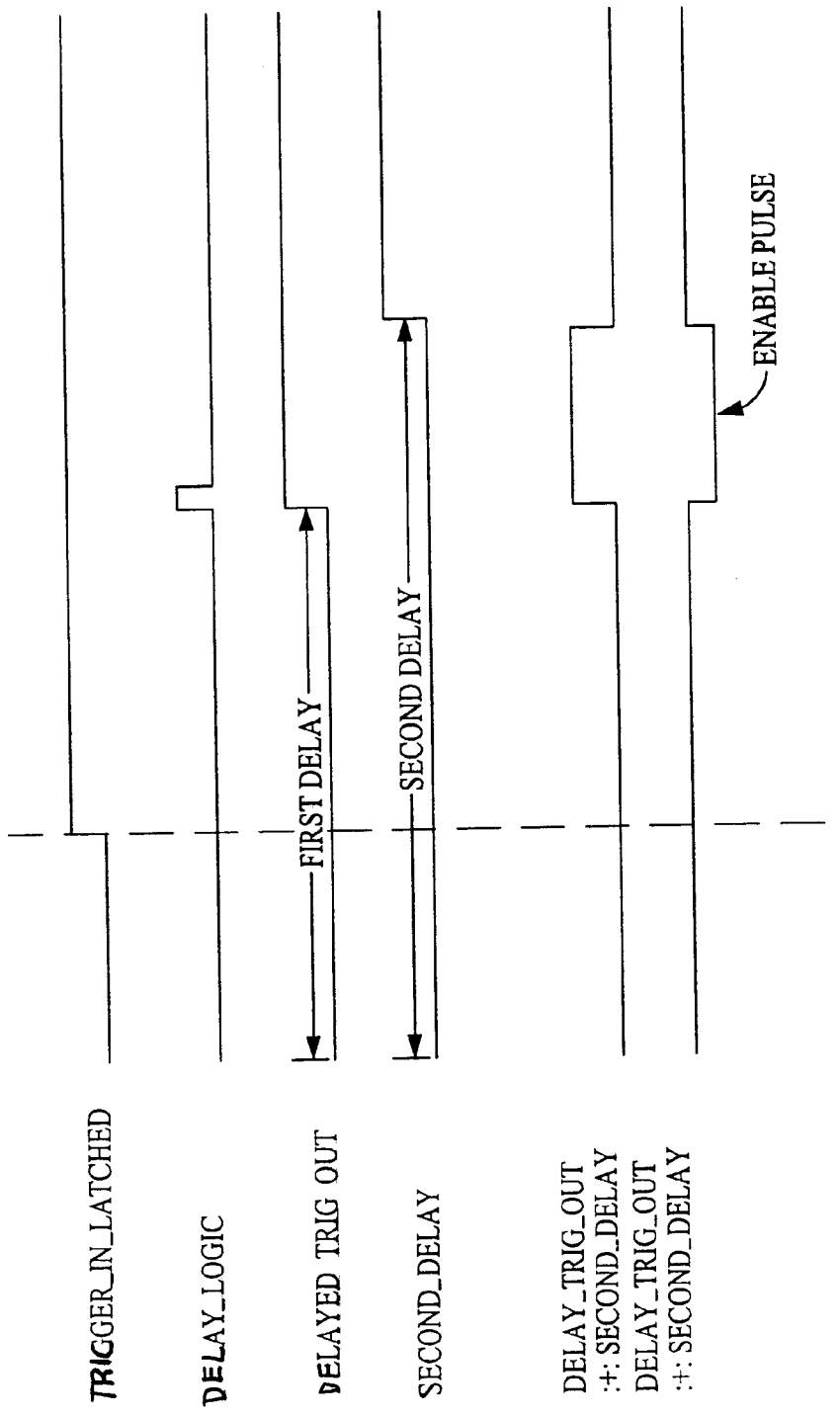
FIG. 3 is a timing diagram of the preferred embodiment of the present invention.

The remaining invention disclosure in relation to FIG. 2 and FIG. 3 describes the control circuitry 28 that receives the sensor device 10 information and then creates the appropriate timed trigger signal to control the underwater strobe light 22. The selected illumination or strobe light 22 used during the AHSUM testing requires a low input pulse, of specific duration, at the exact moment the projectile is passing by the lens of the underwater camera 20. The control circuitry 28 receives the input trigger information either as an open circuit from a break screen sensor or as a voltage spike from a sensing coil which detects the presence of a magnetic projectile 14 passing through it. This signal is sent to a sensor conditioning circuit 29 that outputs a logical high (5V) referenced as TRIGGER_IN 31 pulse. The TRIGGER_IN signal 31 is sent to the input of a programmable array logic (PAL) device (FIG. 2) which contains the circuitry.

The PAL contains discrete logic devices that can be programmed and reconfigured. The waveforms produced by the control circuitry in order to properly control the strobe light are depicted in FIG. 3. Referring now in detail to FIG. 2, the circuitry programmed in the PAL is shown therein. All discrete logic labels are used in the description strictly for explanation purposes. The signal and component labels match those appearing in the following figures.

Control circuitry 28 is implemented using logic circuitry having an asserted or logical high value of 5 volts and a non-asserted or logical low value of 0 volts.

The TRIGGER_IN input signal from one sensing device 10 is sent to the clock input of a first D-flip-flop 32 that is programmed internally in the PAL. The D-input of the first flip-flop 32 is permanently connected to a logical high (5V) source. The purpose of the first flip-flop 32 is to provide a latched logical signal when a projectile passes through the coil or break screen while preventing the output of the circuit from changing in the event of voltage fluctuations at the input. The output of the first flip-flop 32 is labeled TRIGGER_IN_LATCHED 33.

This signal of TRIGGER_IN_LATCHED 33 is sent to a two-input AND gate labeled 34. The other input of the AND gate 34 is a 1 MHz square wave generated by a quartz crystal based oscillator 35 and is labeled CRYSTAL_IN 37.

The main purpose of CRYSTAL_IN signal 37 is to provide a stable clock input to the counters programmed in the PAL. This AND gate 34 acts as a switch which allows the CRYSTAL_IN 37 signal through, only when the TRIGGER_IN_LATCHED signal 33 is high. The output of the AND gate 34 is sent to the clock input of N-Bit Counter 36. The size in bits of the counter 36 (clocked at a 1 MHz or 1 μsec rate) depends on the sum of: 1) the length of time delay required between the initial triggering of the control circuitry by the sensor device 10 and the time the first image is desired; and 2) the time the camera 20 is to acquire images.

The output of the N-Bit Counter 36 is sent to the first Delay Generation Logic section 38. The first delay generation logic section 38 contains logic that utilizes one of ten user selectable preprogrammed delay times. The delay time selected is actually the number of counter transitions that must occur before allowing the output of this logic section to assert itself. From zero, the counter 36 starts incrementing once the clock input from oscillator 35 is enabled via the first AND gate 34. Once the N-Bit Counter 36 reaches the time delay value selected by the user, a high pulse is output from the first delay generation logic 38 and fed into the clock input of a second D flip-flop 40.

Once again the D-input of the flip-flop 40 is permanently connected to a logical high source. Therefore, the first delay generation logic 38 output will latch an output signal of the second flip-flop 40 high until reset. The second flip-flop output is labeled DELAYED_TRIG_OUT 41. The rising edge of DELAYED_TRIG_OUT 41 signifies the beginning of the camera activation window. The next step in the control circuitry is to create an additional delay signal.

The DELAYED_TRIG_OUT signal is provided as input to a second two-input AND gate 42 programmed int eh PAL. The other input of the AND gate 42 is joined to receive the CRYSTAL_IN signal from oscillator 35. The output of the AND gate 42 is sent to the clock input of an independent second N-Bit Counter 44. The size in bits of the second N-Bit Counter 44 depends upon the maximum possible length of the activation window required by the strobe light 22. The N-Bit output of this counter 44 is joined to a second delay generation logic 46. As in the first delay generation logic, this section contains logic that utilizes one of ten user selectable preprogrammed delay times. The delay time selected is actually the number of counter transitions that must occur before allowing the output of this logic 46 to be asserted. The counter 44 starts at zero and will only start incrementing once the CRYSTAL_IN signal is enabled via the second AND gate 42.

Once the N-Bit Counter 44 reaches the time delay value selected by the user, a high pulse is output from the second delay generation logic 46 and provided to the clock input of a third D-flip-flop 48. Once again the D-input of the flip-flop 48 is permanently connected to a logical high source. Therefore, the assertion of the second delay generation logic 46 output will latch the output of the flip-flop 48 to a high signal until reset. The latched signal is labeled SECOND_DELAY. The rising edge of the SECOND_DELAY signifies the end of the camera activation window.

The DELAYED_TRIG_OUT from the second D-flip-flop 40 and SECOND_DELAY from the third D-flip-flop 48 are fed to the two inputs of an exclusive-OR gate 50 which produces a high pulse (activation window) which is high from the time the DELAYED_TRIG_OUT goes high to the time the SECOND_DELAY goes high. The output of the exclusive-OR gate 50 is in turn passed through an inverter 52 to generate the desired low pulse. This output signal, labeled DELAYED_TRIGGER_OUT_PULSE, is buffered by non-inverting buffer 54 and then sent to the trigger of the strobe light 22.

When programmed correctly, the strobe light 22 will be turned on by the control circuitry at the exact moment the projectile 14 passes the lens of the camera 20.

As stated above, the camera 20 has its shutter opened just prior to firing the projectile 14. Thus, the flash of the strobe light 22 provides the high intensity light source required to expose the camera's film, and thereby produce the projectile photograph.

The above circuitry provides an accurate and inexpensive method to control an underwater strobe light for photographic imaging purposes. The circuitry is programmable which provides flexibility and greatly minimizes the need for circuit modifications as test requirements and conditions (i.e., projectile speed) vary.

Finally, it is anticipated that the invention herein will have far reaching applications other than those of underwater projectile testing projects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A high speed photography system comprising:
   a computer;
   a camera joined to said computer, said camera having a shutter controlled by said computer;
   an event producing device joined to said computer, said computer providing a control signal for producing an event;
   a sensor positioned for detecting an effect associated with said event;
   a control circuit joined to said sensor for receiving a signal indicating the detected event; and
   a strobe light joined to said control circuit, said control circuit providing an activating signal to said strobe light a preset time after receiving the indicating signal, and said strobe light lighting on receiving the activating signal;
   said control circuit comprising:
      a sensor conditioning circuit joined to said sensor and providing a trigger in signal output;
      a first latch joined to said sensor conditioning circuit and providing a latched trigger in signal output;
      an oscillator providing a timing signal;
      a first AND gate joined to receive said latched trigger in signal from said first latch and said timing signal, said first AND gate providing a latched timing signal when said latched trigger in signal is asserted;
      a first counter joined to receive said latched timing signal from said first AND gate and providing a first counter output;
      a first delay generation logic circuit joined to receive said first counter output and preselected delay count, said first delay generation logic circuit providing an asserted first delay logic signal when said first counter output exceeds said preselected delay count;
      a second latch joined to said first delay generation logic circuit and receiving said asserted first delay logic signal and providing a latched first delay signal;
      a second AND gate joined to said oscillator and receiving said timing signal and said second latch and receiving said latched first delay signal, said second AND gate providing a second latched timing signal, when said latched first delay signal is asserted;
      a second counter joined to receive said second latched timing signal from said second AND gate and providing a second counter output;
      a second delay generation logic circuit joined to receive said second counter output and second preselected delay count, said second delay generation logic circuit providing an asserted second delay logic signal when said second counter output exceeds said second preselected delay count;
      a third latch joined to said second delay generation logic circuit and receiving said asserted second delay logic signal and providing a latched second delay signal;
      an exclusive OR gate joined to said second latch and receiving said latched first delay signal and joined to said third latch and receiving said latched second delay signal, said exclusive OR gate providing an asserted trigger out signal when only one of latched first delay and latched second delay signals is asserted;
      an inverter joined to said exclusive OR gate, receiving said trigger out signal and providing an inverted trigger out signal; and
      a buffer joined to said inverter, receiving said inverted trigger out signal and providing a buffered control signal to said strobe light.

2. The system of claim 1 wherein said first, second and third latches are d flip-flops.

3. The system of claim 2 wherein said first latch, said second latch, said third latch, said first counter, said second counter, said first delay logic, said second delay logic, said first AND gate, said second AND gate, said exclusive OR gate, and said inverter are programmed on a programmable array logic circuit.

4. The system of claim 1 wherein:
   said event producing device comprises a gun and said event produced comprises firing of a projectile; and
   said sensor detects passage of said projectile.

5. The system of claim 4 wherein:
   said computer opens said camera shutter before causing said gun to fire the projectile; and
   said computer closes said camera shutter a preselected time after opening said shutter.

6. The system of claim 5 further comprising a light shield surrounding said camera and said strobe light and preventing ambient light from entering said camera.

7. A system for controlling a strobe light comprising:
   a sensor positioned for detecting an event;
   a sensor conditioning circuit joined to said sensor and providing a trigger in signal output;
   a first latch joined to said sensor conditioning circuit and providing a latched trigger in signal output;
   an oscillator providing a timing signal;
   a first AND gate joined to receive said latched trigger in signal from said first latch and said timing signal, said first AND gate providing a latched timing signal when said latched trigger in signal is asserted;
   a first counter joined to receive said latched timing signal from said first AND gate and providing a first counter output;
   a first delay generation logic circuit joined to receive said first counter output and preselected delay count, said first delay generation logic circuit providing an asserted first delay logic signal when said first counter output exceeds said preselected delay count;
   a second latch joined to said first delay generation logic circuit and receiving said asserted first delay logic signal and providing a latched first delay signal;
   a second AND gate joined to said oscillator and receiving said timing signal and said second latch and receiving said latched first delay signal, said second AND gate providing a second latched timing signal when said latched first delay signal is asserted;
   a second counter joined to receive said second latched timing signal from said second AND gate and providing a second counter output;

a second delay generation logic circuit joined to receive said second counter output and second preselected delay count, said second delay generation logic circuit providing an asserted second delay logic signal when said second counter output exceeds said second preselected delay count;

a third latch joined to said second delay generation logic circuit and receiving said asserted second delay logic signal and providing a latched second delay signal;

an exclusive OR gate joined to said second latch and receiving said latched first delay signal and joined to said third latch and receiving said latched second delay signal, said exclusive OR gate providing an asserted trigger out signal when only one of latched first delay and latched second delay signals is asserted;

an inverter joined to said exclusive OR gate, receiving said trigger out signal and providing an inverted trigger out signal; and buffer joined to said inverter, receiving said inverted trigger out signal for providing a buffered control signal to said strobe light.

8. The system of claim 7 wherein said first, second and third latches are d flip-flops.

9. The system of claim 8 wherein said first latch, said second latch, said third latch, said first counter, said second counter, said first delay logic, said second delay logic, said first AND gate, said second AND gate, said exclusive OR gate, and said inverter are programmed on a programmable array logic circuit.

* * * * *